Oct. 11, 1949.　　　　　L. BLOK　　　　　2,484,372
HARMONIC GENERATOR
Filed July 16, 1946
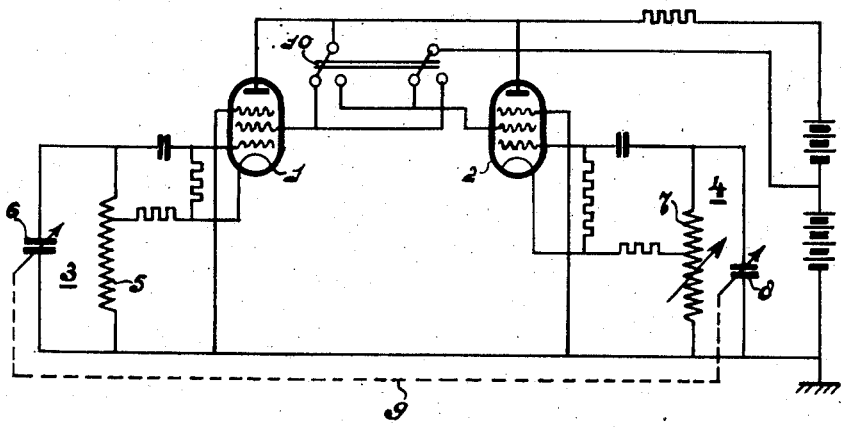
INVENTOR
LOURENS BLOK
BY [signature]
AGENT Patented Oct. 11, 1949

2,484,372

UNITED STATES PATENT OFFICE 2,484,372

HARMONIC GENERATOR

Lourens Blok, Eindhoven, Netherlands, assignor to Hartford National Bank and Trust Company, Hartford, Conn., as trustee Application July 16, 1946, Serial No. 684,070
In the Netherlands January 15, 1943

Section 1, Public Law 690, August 8, 1946
Patent expires January 15, 1963

4 Claims. (Cl. 250—36.)

For certain purposes it is desirable that two alternating voltages whose frequencies are in harmonic relation should be available, for example in the case of devices of the kind described in the copending application, Serial No. 684,069, filed on July 16, 1946.

In a device to be used for this purpose in accordance with the invention the said alternating voltages are generated respectively by two vacuum-tube generators, the output circuit of an alternating current-carrying electrode of one generator being coupled to the output circuit of an alternating current-carrying electrode of the other generator and these electrodes are so proportioned that the frequency of the generator for the lower frequency is independent of, that of the other generator dependent on the alternating voltages which occur at the said electrodes and are in harmonic relation.

In order that the invention may be clearly understood and readily carried into effect it will now be described more fully with reference to the accompanying drawing.

In the preferred embodiment illustrated in which use is made of two pentode generators having similar tubes 1 and 2, cathode, control grid and suppressor grid are utilised at intervals for generating oscillations. For this purpose, the said electrodes are connected in a manner known per se to oscillatory circuits 3 and 4 which are constituted respectively by a coil 5 with a condenser 6 and by a coil 7 with a condenser 8. For the purpose of varying the frequency of the alternating voltages generated the condensers are variable by means of a common operating member 9. Preferably, use is made of identical tuning condensers so that a twofold precision condenser of a type commonly used in radio engineering may be used.

The desired harmonic relation between the tuning frequencies of the circuits 3 and 4 can be approximately maintained in the case of identical tuning condensers 6, 8 and a suitable construction of the circuits within the tuning range by selecting the ratio of the values of the coils 5, 7 in accordance with the desired harmonic relation.

For accurately maintaining the desired harmonic relation it is, however, necessary for the generators to be synchronised. For this purpose, part of the energy generated by the generator tuned to the lower frequency must be fed to the other generator system; an energy transmission in the reversed sense should however not occur, since this may have a severely harmful effect.

To achieve this, the generator 2, 4 tuned to the lower frequency is constructed as an electron-coupled generator by imparting a constant potential to the screening grid.

With the other generator 1, 3 on the contrary, the screening grid is connected direct to the anode. The anodes are coupled by a resistance included in a common part of the anode circuits of the tubes 1, 2 and carry the two alternating voltages set up by the generators. The generator 2 being, however, electron-coupled, the other generator does not affect it, whereas conversely influencing and consequent synchronisation of the higher frequency by the lower frequency occurs so that $f_1 = nf_2$, $n$ being a whole number whose value can be adjusted at will by altering for example the value of the coil 7, as is schematically indicated.

For certain uses it is desirable to provide for the possibility of giving the value 0.5 for example to the factor $n$. Since, however, no longer $f_1 > f_2$ as before, but $f_1 < f_2$ the generator 2 must now be synchronised by the generator 1 whilst the former should not be affected by the latter. In the device according to the invention shown in the drawing this result may be obtained in a simple manner by the use of a double-pole switch 10 which by being moved to the right has the effect of disrupting the original screening-grid connections and of giving a constant potential to the screening grid of the tube 1, whereas the screening grid of the tube 2 is connected to the anodes. The functions of the tubes 1 and 2 as regards the synchronisation are therefore interchanged.

The operation of the device fitted with a switch 10 may be simplified if desired by coupling this switch to that for the change of connections of the coil 4.

What I claim is:

1. Apparatus for generating two oscillations whose respective frequencies are maintained in harmonic relation, said apparatus comprising two oscillation generators each including an electron discharge tube provided with a cathode, a grid, a screen grid, a suppressor grid and an anode, and an oscillatory network operatively coupled to said cathode, said grid and said suppressor grid, the networks of said generators being respectively arranged to produce oscillations substantially in harmonic relation, the screen grid of one tube being coupled to the anode thereof, the screen grid of the other tube being decoupled to oscillations, and means intercoupling the anodes of said tubes, 2. Apparatus for generating two oscillations whose respective frequencies are maintained in harmonic relation, said apparatus comprising two oscillation generators each including an electron discharge tube provided with a cathode, a grid, a screen grid, a suppressor grid and an anode, and an oscillatory network operatively coupled to said cathode, said grid and said suppressor grid, the networks of said generators being respectively arranged to produce oscillations substantially in harmonic relation, the screen grid of one tube being coupled to the anode thereof, means for maintaining the screen grid of the other tube at a constant potential, means intercoupling the anodes of said tubes, and switching means for interchanging the connections of the respective screen grids of said tubes.

3. Apparatus for generating two oscillations whose respective frequencies are maintained in harmonic relation, said apparatus comprising two oscillation generators each including an electron discharge tube provided with a cathode, a grid, a screen grid, a suppressor grid and an anode, and an oscillatory network operatively coupled to said cathode, said grid and said suppressor grid, the networks of the generators being respectively arranged to produce oscillations substantially in harmonic relation, a resistor, a potential source, means to apply a positive potential from said source through said resistor to the anodes of both tubes, means connecting the screen grid of one tube to the anode thereof, and means connecting the screen grid of the other tube to a point in said source.

4. Apparatus for generating two oscillations whose respective frequencies are maintained in harmonic relation, said apparatus comprising two oscillation generators each including an electron discharge tube provided with a cathode, a grid, a screen grid, a suppressor grid and an anode, and an oscillatory network coupled to said cathode, said grid and said suppressor grid, the networks of the generators being respectively arranged to produce oscillations substantially in harmonic relation, a resistor, a potential source, means to apply a positive potential from said source through said resistor to the anodes of both tubes, means connecting the screen grid of one tube to the anode thereof, means connecting the screen grid of the other tube to a point in said source, and switching means for interchanging the connections of the respective screen grids of said tubes.

LOURENS BLOK.

REFERENCES CITED

The following references are of record in the file of this patent:

UNITED STATES PATENTS

| Number | Name | Date |
|---|---|---|
| 2,248,481 | Schuttig | July 8, 1941 |
| 2,329,069 | Markowitz | Sept. 7, 1943 |